(No Model.)

E. C. LAINSON.
HORSESHOE CALK SHARPENER.

No. 532,883. Patented Jan. 22, 1895.

Witnesses
H. H. Raymond
C. F. Bausenwein

Edwin C. Lainson Inventor
By Attorney William J. Knox.

UNITED STATES PATENT OFFICE.

EDWIN CHARLES LAINSON, OF COUNCIL BLUFFS, IOWA.

HORSESHOE-CALK SHARPENER.

SPECIFICATION forming part of Letters Patent No. 532,883, dated January 22, 1895.

Application filed February 27, 1892. Serial No. 422,975. (No model.)

*To all whom it may concern:*

Be it known that I, EDWIN CHARLES LAINSON, a citizen of the United States, residing at Council Bluffs, in the county of Pottawattamie and State of Iowa, have invented a Device for Sharpening the Calks of Horseshoes, of which the following is a specification.

The object of my invention is to provide a portable rotary filing device by which the calks of horse shoes, may be sharpened without removing the shoe from the animal's foot, and so simple that it may be operated by anyone. This I attain by the mechanism illustrated in the accompanying drawings, in which—

Figure 1:
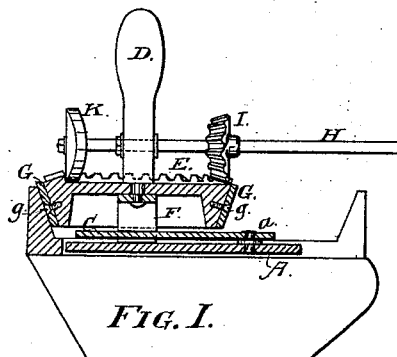
Figure 3:
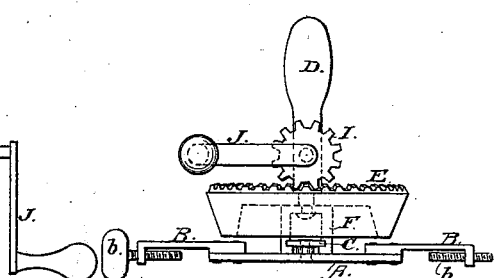
Figure 2:
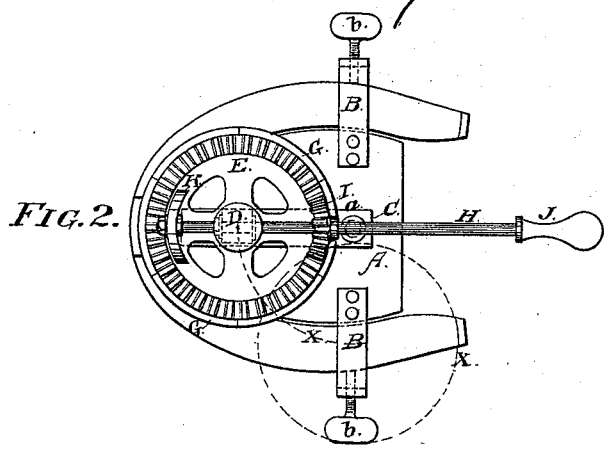

Figure 1, is a sectional elevation, showing the device in position on the horse's foot. Fig. 2, is a plan of Fig. 1; Fig. 3, an elevation of the machine detached from the shoe.

Similar letters refer to similar parts throughout the several views.

A, is the hoof plate, fitted with clamp bars B.

C is the guide bar pivoted to the hoof plate at $a$.

D, is the hand knob. The stem of D, passes through the gear disk E, and slotted head F, and is riveted over at the lower end. The disk E, and head F, are loose upon the stem and free to revolve.

G, G are file plates, held by screws $g$ to the periphery of the gear disk E.

The driving shaft H, passes through the hand knob D, which acts as a bearing for the shaft; and to the shaft are securely fastened the pinion I, and crank arm J; and at one end of the shaft and free to revolve upon it, is the steady wheel K. The wheel K, is made to come just in contact with the inner face of the gear disk.

To attach the machine and operate it, the horse's foot is raised as for shoeing, and the hoof plate A, by the clamps B, and thumb screws $b$, is secured to the shoe. The slotted head F, with gear disk, driving shaft, &c., all in place, is slipped upon guide bar C, and swung around until the file plate G, comes in contact with the calk to be sharpened. With the knob in one hand the operator now holds the file firmly against the calk while with the other hand, by the crank J, he revolves shaft H, and pinion I, putting gear disk E, and consequently file G, in motion.

The full lines in Fig. 2, show the file in contact with the toe calk, while dotted lines X, X, indicate how it will be swung round to bring file in contact with heel calks.

Should the animal become restless or for any reason it be desirable to permit the foot to be put down, the machine can in an instant be slipped off the guide bar, leaving the hoof plate only in position.

Having described my invention, what I claim as new, and desire to secure by Letters Patent, is—

1. In a horseshoe calk sharpener, the combination, with a hoof plate provided with means for securing it in position, of a guide bar pivotally secured thereto, a gear disk adjustably and detachably mounted on the free end of the guide bar, the periphery of which is provided with means for engaging with and sharpening the calk, and means for holding the disk in contact with the calk and for operating the same, substantially as set forth.

2. In a horseshoe calk sharpener, the combination, with the hoof plate, of a pair of clamping bars and set screws for securing it to the hoof, a guide bar pivotally secured to the plate, a gear disk detachably and adjustably mounted on the free end of the guide bar, the periphery of which is provided with files, a handle for holding the disk and moving it upon the bar, a shaft journaled in said handle having a crank at its outer end, and a gear pinion upon the shaft for engaging with the disk, substantially as set forth.

3. In a horseshoe calk sharpener, the combination, with a hoof plate provided with means for securing it in position, of a guide bar pivotally secured thereto, a gear disk detachably and adjustably mounted upon the bar, the periphery of which is provided with files, and the upper surface is provided with teeth, a handle for holding and moving the disk upon the bar, a shaft journaled in said handle, one end of which is provided with a crank and the other end is provided with a steady wheel, the periphery of which is adapted to just come in contact with the gear disk, and a gear pinion upon the shaft between the handle and the crank for engaging with the teeth of the gear disk, substantially as set forth.

EDWIN CHARLES LAINSON.

Witnesses:
H. J. CHAMBERS,
T. G. SANDERS.